United States Patent [19]

Dahlerud

[11] Patent Number: 4,679,104
[45] Date of Patent: Jul. 7, 1987

[54] METHOD AND ARRANGEMENT FOR POSITIONING A MAGNETIC HEAD TO VARIOUS TRACKS OF A MAGNETIC TAPE

[75] Inventor: Ole C. Dahlerud, Oslo, Norway
[73] Assignee: Tandberg Data A/S, Oslo, Norway
[21] Appl. No.: 819,496
[22] Filed: Jan. 16, 1986
[30] Foreign Application Priority Data
  Feb. 8, 1985 [DE] Fed. Rep. of Germany ....... 3504384
[51] Int. Cl.⁴ .............................................. G11B 5/55
[52] U.S. Cl. .................................................... 360/78
[58] Field of Search .......................................... 360/78
[56] References Cited
U.S. PATENT DOCUMENTS

| | | | |
|---|---|---|---|
| 3,731,177 | 5/1973 | Commander et al. | 318/603 |
| 3,800,317 | 3/1974 | Lin | 360/78 |
| 4,136,365 | 1/1979 | Chick et al. | 360/78 |
| 4,313,141 | 1/1982 | Yanagida et al. | 360/78 |
| 4,476,503 | 10/1984 | Solhjell | 360/75 |
| 4,563,713 | 1/1986 | Cahoon et al. | 360/78 |

FOREIGN PATENT DOCUMENTS

| | | | |
|---|---|---|---|
| 0051754 | 5/1982 | European Pat. Off. | |
| 2327031 | 12/1974 | Fed. Rep. of Germany | |
| 3032797 | 4/1982 | Fed. Rep. of Germany | |
| 55-97025 | 7/1980 | Japan | 360/78 |
| 56-68965 | 6/1981 | Japan | 360/78 |
| 827667 | 2/1960 | United Kingdom | |

OTHER PUBLICATIONS

8013 Journal of the Audio Engineering Society, vol. 25, No. 12 (1977., Dec.), pp. 1041-1044, "A Uniform Track Positioning and Dimensioning System for Magnetic Recording", by E. R. Hanson.
Japan Patent Abstract 55-97025 of Hideaki Koiwai, "Positioning Device Using Microcomputer", vol. 4, No. 149 (P-32) (631), Oct. 21, 1980.
Japan Patent Abstract 57-152515(A) of Tomohisa Yoshimaru, "Tracking System", vol. 6, No. 255 (P-162) (1133) Dec. 14, 1982.
Japan Patent Abstract 58-218031(A) of Masayuki Satou, "Magnetic Tape Storage Device", vol. 8, No. 72 (P-265) (1509) Apr. 4, 1984.

Primary Examiner—George G. Stellar
Attorney, Agent, or Firm—Hill, Van Santen, Steadman & Simpson

[57] ABSTRACT

For exact positioning of a magnetic head to various tracks of a magnetic tape by use of a stepping motor, a plurality of motor control steps required in order to position the magnetic head to the various tracks proceeding from a reference position are identified. For the compensation of manufacturing tolerances, individual positional values are identified for every magnetic tape recorder. These positional values indicate a precise position of the magnetic head on the center of the respective track. The positional values are stored in a read-only memory, or are formed by addition of stored standard values and correction values stored in a read-only memory.

14 Claims, 6 Drawing Figures

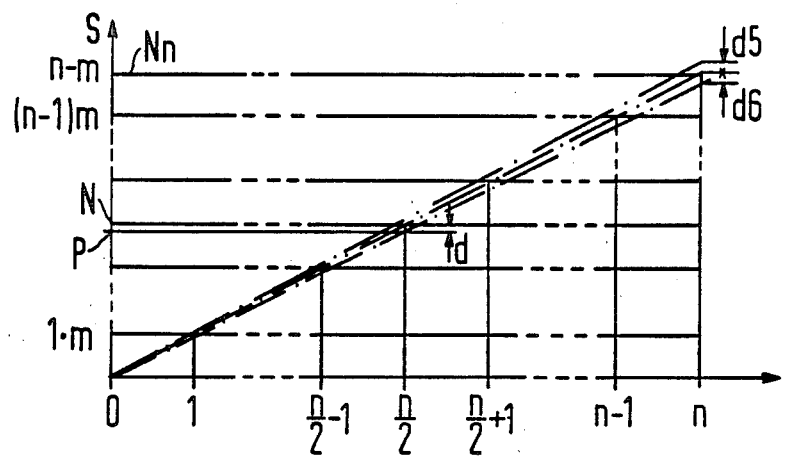
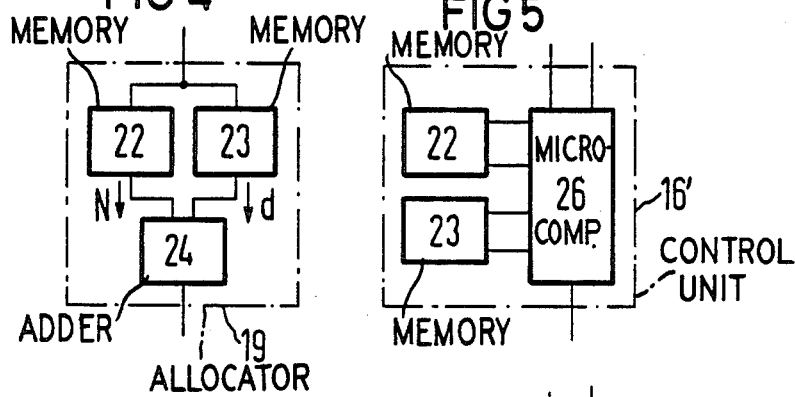

METHOD AND ARRANGEMENT FOR POSITIONING A MAGNETIC HEAD TO VARIOUS TRACKS OF A MAGNETIC TAPE

BACKGROUND OF THE INVENTION

The invention relates to a method for positioning a magnetic head to various tracks of a magnetic tape in a magnetic tape recorder wherein the magnetic head is positioned to the various tracks perpendicular to a moving direction of the magnetic tape by use of a positioning device provided with an electric motor.

German OS No. 32 44 149, corresponding to U.S. Pat. No. 4,609,959, incorporated herein by reference, discloses an arrangement for positioning a magnetic head to various tracks of a magnetic tape wherein the magnetic tape is accommodated in a cassette which is inserted into the magnetic tape recorder in a longitudinal direction. The magnetic tape is moved in a longitudinal direction by use of a tape drive capstan, and the recording occurs on a plurality of parallel tracks by use of a magnetic head. The magnetic head is provided, for example, with two write/read heads arranged above one another and the recording occurs, for example, in four parallel tracks. The magnetic head is positioned to the various tracks by use of a positioning device. The positioning device contains a stepping motor at which a worm gearing is situated, this worm gearing cooperating with a screw gearing via which a magnetic head carrier accepting the magnetic head is shifted perpendicular to the moving direction of the magnetic tape.

Although precise component parts are used for the positioning device, a deviation of a write/read head of up to ±40 μm from the precise center of a track is possible when the magnetic head is positioned at the outer tracks. In magnetic tape recorders having a low number of tracks, this deviation does not present any difficulties in the recording or playback of signals. When, however, the number of tracks on the same magnetic tape is increased to, for example, 8 or even 20, such tolerances of ±40 μm can no longer be accepted.

SUMMARY OF THE INVENTION

It is therefore an object of the invention to specify a method and an arrangement for positioning a magnetic head to various tracks of a magnetic head given a situation in which a precise positioning of the write/read heads to the centers of the tracks is possible, even given a high number of tracks on the magnetic tape.

Given the method of the type initially cited, this object is achieved in accordance with the invention by identifying a substantially exact desired position of the write/read head of the magnetic head at a center of the various tracks on the magnetic tape during a measuring procedure by a positioning to at least one track relative to the reference position. Positional values for the electric motor are allocated to substantial exact positions. During normal operation of the magnetic tape recorder, control signals are generated for a motor controller connected to the motor by a comparison of actual positions of the write/read head to the substantially exact desired positions so as to drive the electric motor of the positioning device.

The method of the present invention has the advantage that, even in magnetic tape recorders wherein a high number of tracks is employed, the component parts of the magnetic tape recorders for the lower track density can be utilized without higher demands made of the tolerances, since the compensation of the tolerances does not occur by means of mechanical techniques but by means of electronic techniques. No added costs whatsoever are thus required for the mechanical structure in order to be able to undertake precise positioning to a plurality of tracks.

The position values identified during the measuring procedure are preferably stored in an erasable and rewritable read-only memory.

It is also possible to form the positional values from standard values which are identical for a plurality of magnetic tape recorders, and from correction values individually identified for every magnetic tape recorder during the measuring procedure.

For example, a center track can be provided as a reference position and the positional values of the positions of the write/read heads from the centers of the respective outer tracks are identified during the measuring procedure. An outer track can also be employed as the reference position and the positional values in the direction toward the other outer track are identified during the measuring procedure. Furthermore, an edge of the magnetic tape can also be employed as a reference position.

When the positioning device contains a stepping motor, the positional values respectively indicate a prescribed number of steps which correspond to the position. When the positional values are formed from the standard values and the correction values, these steps are respectively subtracted or added from the number of normal steps in order to precisely position the write/read head to the center of the track.

It is also conceivable to employ a dc motor for the positioning device, this dc motor being equipped with a timing disk and allocated opto-electronic sensing elements. In this case, the positional values or the correction values indicate respective prescribed pluralities of clock pulses or the number of clock pulses to be subtracted or added from the respective number of normal clock pulses.

The positioning devices also frequently have a different amount of play, dependent on the direction in which the positioning event occurs. Thus, for example, the number of steps for positioning a center track can differ dependent on the direction in which positioning to this center track is carried out, i.e. from which outer track positioning in the direction of this center track is undertaken. For the compensation of this play, the positional values or the correction values for the various tracks can be of various sizes, dependent on the direction from which positioning to this track is undertaken.

The identification of the positional values or of the correction values can occur in that the write/read head is precisely positioned to the center of every track during a measuring procedure, and the positional values or the correction values are thereby identified. It is also possible, for example, proceeding from the center reference position, to identify the positional values or the correction values at the two outer tracks, and to identify the positional values or the corrections for the intervening tracks by means of interpolation. It can also be sufficient to respectively combine the correction values of a group of mutually adjoining tracks and to respectively employ the correction value allocated to this group when positioning to an arbitrary track of this group.

An advantageous arrangement for the implementation of the method of the invention is that a control unit is provided which generates the control signals for a motor control of the electric motor of the positioning device. It generates these control signals from the difference between a value allocated to the actual position of the magnetic head and a rated or desired positional value identified during the measuring procedure. The control unit can contain an erasable and re-writable read-only memory in which the positional values individually identified for every magnetic tape recorder are stored after the measuring procedure and which, during positioning to a track, emits the positional values to a comparator which compares these positional values to values for the respected actual position of the magnetic head which are stored in a memory. The control unit can also contain a read-only memory in which the standard values allocated to all tracks are stored. It can also contain a further memory in which the correction values are stored, and an adder which adds the correction values to the standard values when a specific track is selected. The correction values can have positive or negative operational signs, so that an addition or a subtraction occurs in the adder.

The control unit can also comprise a microcomputer which generates the control signals for the positioning device by use of the positional values or of the correction values.

The memory for the correction values can also be fashioned as a switch unit having a plurality of switches which, for example, emit a correction value which occurs given positioning to an outer track. The correction values of the inner tracks can then be concluded from this correction value by interpolation.

BRIEF DESCRIPTION OF THE DRAWINGS

FIG. 3 is an illustration of the deviations of a write-/read head in a magnetic head upon positioning to the centers of various tracks;

FIG. 4 is a first embodiment of a control unit;

FIG. 5 is a second embodiment of the control unit; and

FIG. 6 is a third embodiment of the control unit.

DESCRIPTION OF THE PREFERRED EMBODIMENTS

Figure 1:
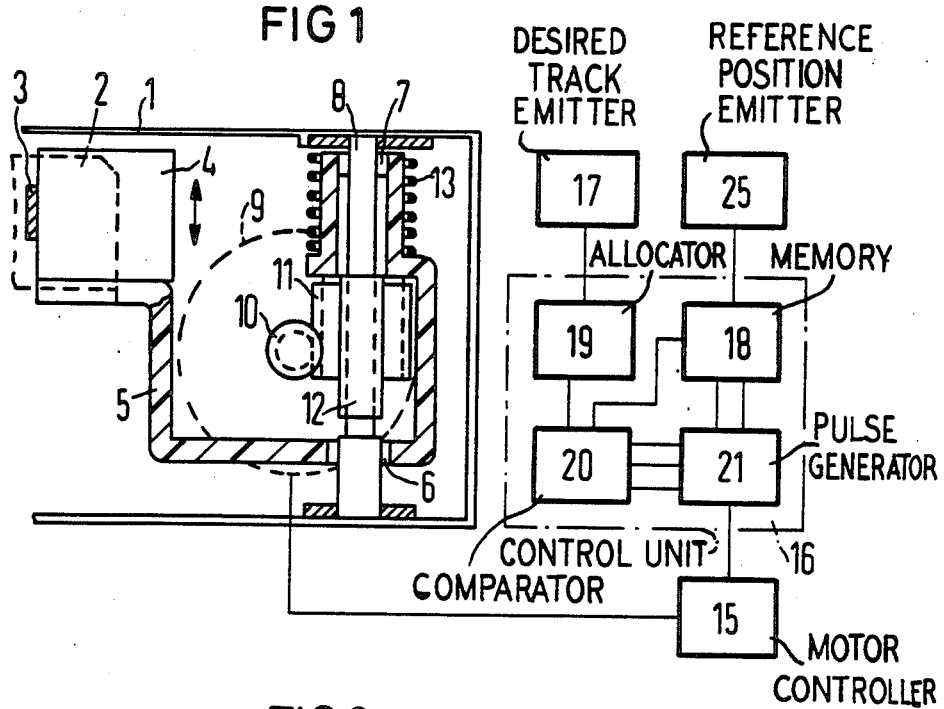
FIG. 1 is a block diagram of the arrangement for the implementation of the method.

The arrangement shown in FIG. 1 shows a portion of a magnetic tape recorder means which is designed as a cassette magnetic tape recorder. Such a cassette magnetic tape recorder can be derived, for example, from German OS No. 32 44 165 or from German OS No. 32 44 149, both incorporated herein by reference. Situated in a housing 1 of the magnetic tape cassette recorder are a drive arrangement (not shown) for the magnetic tape 3 and a positioning device for a magnetic head 4 in order to position write/read heads of the magnetic head 4 to various tracks of the magnetic tape 3. A magnetic tape cassette 2 (shown with broken lines) comprising the magnetic tape 3 is insertable into the magnetic tape recorder. During operation of the magnetic tape recorder, the magnetic head 4 engages into an opening of the cassette 2. The magnetic head 4 is secured to a head carrier 5 by use of two bearings 6 and 7, and is displaceable along an axis or shaft 8 in a transverse direction to the magnetic tape 3.

The displacement of the magnetic head 4 occurs by use of an electric motor 9 preferably fashioned as a stepping motor, but which can also be fashioned as a DC motor. A worm 10, which is in functional communication with a worm wheel 11, is secured to the shaft of the motor 9. In the region of the worm wheel 11, the shaft 8 comprises an outside thread 12 which is in functional communication with an inside thread of the worm wheel 11. When the worm 10 turns, the worm wheel 11 is driven, so that this moves in an axial direction of the shaft 8. A compression spring 13 presses the head carrier 5 against the worm wheel 11 so that this follows the movement of the worm wheel 11 in an axial direction and thus positions the magnetic head 4 to various tracks of the magnetic tape 3. The head carrier 5 is prevented from turning with the rotation of the worm wheel 11 during the movement of the head carrier 5 in an axial direction of the shaft 8. During insertion or removal of the cassette 2, the magnetic head 4 together with the head carrier 5, however, is pivotable out of the working position into an idle position. The motor 9 receives control signals from a motor controller 15, these control signals being fashioned, for example, as stepping pulses, when the motor 9 is a stepping motor. The motor controller 15 is driven by a control unit 16 which receives the control signals when a write/read head in the magnetic head 4 is positioned to a specific track of the magnetic tape 3. It receives these control signals in order to proceed from an actual position, for example from a specific track, to a rated or desired position, for example to another track. The function of such a control unit 16 is well known for a normal positioning and may be derived, for example, from U.S. Pat. No. 4,313,141, incorporated herein by reference.

The control unit 16 is informed of a specific track by a central control unit of the magnetic tape recorder or by a microcomputer which are schematically shown as a desired track emitter 17. The actual position in which the magnetic head 4 is respectively situated is stored in a memory 18.

At the beginning of operation of the magnetic tape recorder, the magnetic head 4 is brought into a reference position which is determined by the reference position emitter 25. This reference position, for example, is an outer edge of the magnetic tape 3 which is identified by a method as disclosed in German OS No. 31 12 886, corresponding to U.S. Pat. No. 4,476,503, incorporated herein by reference. The reference position can also be a first, for example, outer or center track of the magnetic tape 3 or, as disclosed by U.S. Pat. No. 4,313,141, can be a defined position of the positioning device which is recognized by means of a light barrier. This reference position is then the actual position and is stored in the memory 18.

The control unit 16 contains an allocator 19 fashioned as a read-only memory which converts the track number output by the desired track emitter 17 into a rated or desired position. Both the desired position output by the allocator 19 as well as the actual position output by the memory 18 are supplied to a comparator 20 which uses the difference between the desired and actual positions in order to identify the spacing, both with respect to amount as well as with respect to direction, and initiates a pulse generator 20 to emit pulses for the stepping motor 9 to the motor controller 15 until the desired position and the actual position coincide. The magnetic head 4 is thus positioned to the desired track upon employment of the motor 9. At the same time, the pulses are supplied to the memory 18 so that this contains the new actual position. For this purpose, the memory 18 can contain an adder which respectively subtracts the corresponding numbers of pulses from the actual position, or adds them thereto. It can also be designed as a counter whose counter reading indicates the respective actual position and which is respectively incremented or deincremented by the pulses emitted by the pulse generator 21.

As already mentioned, the motor 9 can also be designed as a dc motor. In this case, a timing disk can be situated on the shaft of the dc motor for precise positioning, a plurality of slots in the timing disk being sensed by opto-electronic elements. In this case, the pulse generator 21 emits signals to the motor controller 15 until a prescribed number of clock pulses has been sensed, this prescribed number of clock pulses corresponding to the difference between the rated position and the actual position.

When the recording of data on the magnetic tape 3 occurs in four parallel tracks, and the magnetic head 4 contains two write/read heads which are respectively positionable to two of the tracks, the corresponding desired positions are permanently stored in the allocator 19 as identical standard values N for a plurality of magnetic tape recorders, and the positioning occurs without difficulties. When, however, recording on the magnetic tape occurs in a great number of tracks, for example 20 tracks, it can occur that the same desired positions can no longer be stored for all magnetic tape recorders of a series, since the write/read heads are no longer precisely positioned to the centers of the various tracks as a consequence of mechanical tolerances in the positioner device.

Figure 2:
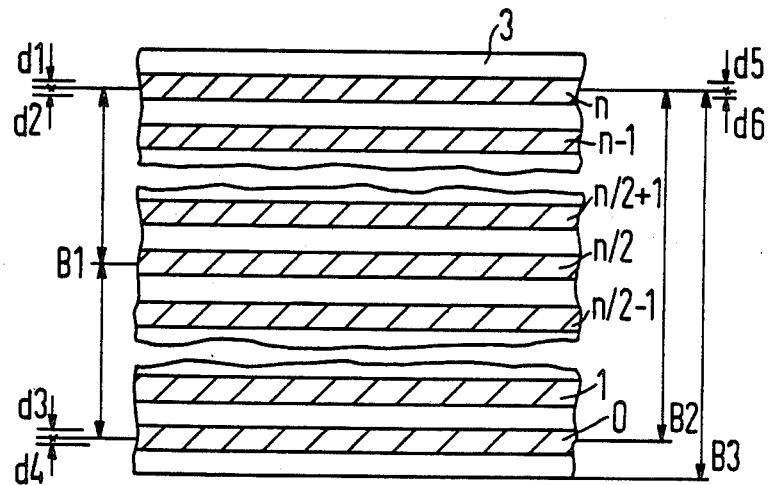
FIG. 2 is a schematic illustration of n tracks on a magnetic tape.

The illustration in FIG. 2 shows a short section of the magnetic tape 3 on which the data are recorded in a plurality n of tracks. A center track n/2 can be employed, for example, as a reference position B1 from which positioning to other tracks is undertaken. When from this reference position B1 positioning is undertaken, for example, to the tracks n or 0, deviations d1 through d4 which no longer coincide with the provided centers of the tracks can occur as a consequence of mechanical tolerances in the positioning device. Deviations d5 and d6 can occur in a corresponding fashion when, proceeding from an outer track 0 as a reference position B2, or from the edge of the magnetic tape 3 as a reference position B3, positioning is undertaken to the other outside track n. These deviations d5 and d6 can, for example, be greater than the deviations d1 through d4 since the path which the magnetic head 4 traverses is greater in these cases than given employment of the reference position B1.

In the illustration in FIG. 3, the deviations in the positioning to the tracks 0 through n are shown in the form of a diagram, whereby it is assumed that the outer track 0 is selected as a reference position. An analogous case applies given employment of a center track as reference position B1, or of the edge of the magnetic tape 3 given the reference position B3. During a measuring procedure after mounting of the positioning device and of the magnetic head 4, either the precise positional values P necessary for positioning to the centers of the desired tracks, and which are to be stored in the allocator 19, or deviations from the centers of the tracks identified during positioning to the standard values N stored in the allocator 19, are identified in the form of correction values d, these indicating the exact positions or the deviations by a respective plurality of steps, given employment of a stepping motor, or by a respective plurality of clock pulses given the employment of a dc motor with a timing disk. Given positioning to the track n, these correction values correspond to the deviations d5 or d6. In order to proceed from the track 0 to track n, n×m steps in accordance with the content of the allocator 19 are required as standard value Nn, these being indicated in the ordinate direction when a stepping motor is employed as the electric motor 9. In a corresponding fashion, n/2 ×m steps are required as a standard value N in order to proceed to a center track n/2. Even more or fewer steps can be required for precise positioning to the center of this track, these being defined, together with the standard value N, by the positional value P or by the respective correction value d for the track. The positional values P, or the correction values d, are identified and stored for every magnetic tape recorder after assembly of the positioning device. The corresponding positional value or correction value d can therefore be identified for every track. Proceeding from the respective reference position, it is also possible when positioning to a remote track, for example the outer track, to identify the overall value and to identify the values at the other tracks by interpolation. It is also possible to respectively combine a group of mutually adjoining tracks and to provide them with a correction value d.

The deviation can amount to ±40 μm when positioning from an outer track to the other outer track, or from the edge of the magnetic tape 3 to the outer track at the other edge of the magnetic tape. This deviation can correspond to ±8 steps of the stepping motor 9. The correction value d can then be specified by a four bit word, whereby the most significant bit indicates the operational sign and the remaining three bits indicate the number of steps. The respective correction value d for every track or every group of tracks can then be determined by interpolation, for example linear interpolation. When positioning to a prescribed track, the allocator 19 then does not specify the normal number of steps, but rather the number of steps corrected by the correction value.

The allocator 19 shown in FIG. 1 can be constructed as what is referred to as a EEPROM (electrically erasable and programmable read-only memory), and the positional values P for every track are stored in it after the measuring procedure.

The allocator 19 shown in FIG. 4 contains, on the one hand, a memory 22 for the standard values N of the plurality of steps for positioning to the various tracks. A memory 23 for the correction values d is additionally provided. When positioning to a specific track which is specified by the desired track emitter 17, the standard value N and the correction value d are read out of the memory 22 or the memory 23, and are added in an adder 24 and are output to the comparator 20 as a desired position. As already mentioned, the correction values d can be provided in the memory 23 for every track. The same correction value d can also be present for one respective group of tracks. Furthermore, the correction values d can differ, depending upon the direction in which positioning to a specific track is undertaken in order to compensate a play in the positioning device which is dependent on rotational sense.

The control unit 16' shown in FIG. 5 contains a microcomputer 26 to which the desired track emitter 17 can supply the respective desired track number, and to which the signals allocated to the reference position can also be supplied by the reference position emitter 25. The control unit 16' contains a memory for the positional values P which is fashioned as an electrically erasable and programmable read-only memory, or contains the two memories 22 and 23 for the standard values N or the correction values d. The microcomputer 26 uses the positional values P or the normal values N and the correction values d to identify the respective desired rated position, and emits the corresponding control signals to the motor controller 15.

Given the control unit 16" shown in FIG. 6, this likewise comprises a microcomputer 26. The switch memory 23' for the correction values d is constructed as a switch unit which comprises a plurality of switches, for example four switches. During a measuring procedure after assembly of the positioning device, the deviation d5 or d6 when positioning to the other outer track proceeding, for example, from an outer track or the edge of the magnetic tape 3, is identified and the corresponding number of steps of the stepping motor 9 is input by three switches in binary coded fashion. A further switch indicates the operational sign of the deviation. When, as already set forth above, the deviation can comprise up to ±8 steps, this deviation can be set in binary coded form by the three switches, and the fourth switch indicates the operational sign. One step corresponds to a deviation of ±5 μm. By means of linear interpolation, the microcomputer 26 then identifies the deviation for the respective track, or for a group of tracks, in order to be able to undertake positioning to the center of the respective track with optimum precision.

Given employment of a read-only memory for the positional values P, the overall number of steps which corresponds to the sum of the standard value N and the correction value d, is identified for every track during the measuring procedure, and is stored in the read-only memory, which then represents the allocator 19. In this case, an addition or subtraction of the correction values d is not necessary since the correction values d are already taken into consideration in the measuring procedure.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for positioning a magnetic head to various tracks of a magnetic tape in a magnetic tape recorder, comprising the steps of:
   positioning said magnetic head to said various tracks perpendicular to a moving direction of said magnetic tape by use of a positioning device provided with an electric motor;
   defining a reference position on the magnetic tape;
   identifying substantially exact desired position of a write/read head of said magnetic tape during a measuring procedure by a positioning to at least one track relative to said reference position;
   determining desired positional values corresponding to said substantially exact desired positions; and during normal operation of said magnetic tape recorder, generating actual positional values corresponding to actual positions of the write/read head, and control signals for a motor controller connected to the motor being derived by a comparison of the actual positional values to said desired positional values so as to drive said electric motor of said positioning device unitl the actual and desired positional values correspond.

2. A method according to claim 1 including the step of forming the desired positional values from standard values identical for a plurality of magnetic tape recorders and from correction values individually identified for every magnetic tape recorder.

3. A method according to claim 1 including the step of providing as a reference position one of the references selected from the group consisting of: a reference position allocated to a center track, a reference position allocated to an outer track, or a reference position allocated to an edge of the magnetic tape.

4. A method according to claim 1 including the step of allocating said control signals to a prescribed plurality of steps for a drive of the electric motor of the positioning device, and providing the electric motor as a stepping motor.

5. A method according to claim 1 including the steps of allocating the control signals to a prescribed plurality of clock signals for drive of the electric motor of the positioning device, and providing the electric motor as a dc motor with a timing disc.

6. A method according to claim 1 including the step of providing the desired positional values differently dependent on a direction in which positioning to a track is undertaken.

7. A method according to claim 1 including the step of identifying the desired positional values for the various tracks through interpolation by positioning to a track remote from the reference position.

8. A method according to claim 2 including the step of allocating a same correction value to a group of mutually adjoining tracks on the magnetic tape.

9. A system for positioning a magnetic head to various tracks for a magnetic tape in a magnetic tape recorder, comprising:
   means for postioning said magnetic head to said various tracks perpendicular to a moving direction of said magnetic tape by use of a positioning device provided with a connected electric motor;
   means for defining a reference position on the tape;
   means for identifying substantially exact desired positions of a write/read head of said magnetic head at respective centers of said various tracks on said magnetic tape during a measuring procedure by positioning to at least one track relative to said reference position;
   means for detemining desired postional values corresponding to said substantially exact desired positions;
   means for generating acutal positional values corresponding to actual positions of the write/read head; and
   means for generating control signals for a motor controller connected to the motor during normal operation of said magnetic tape recorder by a comparision of the actual positional valves of the write/read head to said desired positional values so as to drive said electric motor of said positioning device until the actual and desired values correspond.

10. A system according to claim 9 wherein said means for generating control signals comprises a control unit means for generating the control signals for said motor controller from a difference between an actual position of the magnetic head and a desired position of the magnetic head identified by the identifying means.

11. A system according to claim 10 wherein said control unit means has an erasable and reprogrammmable read-only memory means for storing desired positions individually identified for every magnetic tape recorder by said identifying means; and said control unit means further including a comparator means, the read-only memory means outputting said positions to said comparator means, said comparator means comparing said positions to a further memory means contained in said control unit means, said further memory means storing respective actual positions of said magnetic head.

12. A system according to claim 10 wherein said control unit means comprises an adder means for emitting values allocated to the desired position when positioning to a track, said adder means forming said emitted values from standard values for positioning and corresponding correction values; means for individually identifying the correction values for every magnetic tape recorder; and comparator means connected to receive said emitted values from said adder means, said comparator means comparing said emitted values to values stored in a memory means for storing respective actual positions of the magnetic head.

13. A system according to claim 10 wherein said control unit means comprises a microcomputer means for using the desired positions for generating control signals for said motor controller for driving said electric motor in said positioning device.

14. A method for positioning a magnetic head to various tracks of a magnetic tape in a magnetic tape recorder, comprising the steps of:

positioning said magnetic head to said various tracks perpendicular to a moving direction of said magnetic tape by use of a positioning device provided with an electric motor;

defining a reference position on the tape;

identifying substantially exact desired positions of a write/read head of said magnetic head at respective centers of said various tracks on said magnectic tape during a measuring procedure by a positioning to at least one track relative to said reference position; and during normal operation of said magnetic tape recorder, generating control signals for a motor controller connected to the motor by a comparison of actual positions of the write/read head to said substantially exact desired positions so as to drive said electric motor of said positioning device until said actual desired positions correspond.

* * * * *